United States Patent Office 3,041,359
Patented June 26, 1962

3,041,359
2,2-DIALKYL ANDROGENIC TYPE HORMONES
Howard J. Ringold and Albert Bowers, Mexico City, Mexico, assignors to Syntex S.A., Mexico City, Mexico, a corporation of Mexico
No Drawing. Filed Aug. 29, 1958, Ser. No. 757,908
Claims priority, application Mexico Sept. 3, 1957
21 Claims. (Cl. 260—397.3)

The present invention relates to cyclopentanophenanthrene compounds and to a process for the production thereof.

More particularly the present invention relates to novel androgenic type hormones which are 2,2-dialkyl derivatives of 19-nor-testosterone, 19-nor-dihydrotestosterone, 17-lower alkyl-19-nor-testosterone, 17-lower alkyl-19-nor-dihydrotestosterone, 17 - vinyl - 19 - nor-testosterone, 17-vinyl-19-nor-dihydrotestosterone, 17-ethinyl-19-nor-testosterone and 17-ethinyl-19-nor-dihydrotestosterone. The present invention also relates to active hormones of the androgenic type which are the corresponding 3-hydroxy derivatives of the aforementioned compounds. The novel useful 19-nor androgens of the present invention show a marked anabolic effect and practically lack androgenic activity, they inhibit secretion of the gonadotropic by the pituitary gland and have substantial anti-estrogenic activity.

It has been discovered in accordance with the present invention that treatment of 19-nor-dihydrotestosterone (19-nor-androstan-17β-ol-3-one) or 17-lower alkyl or 17-vinyl 19-nor-dihydrotestosterone (17α-lower alkyl-19-nor-androstan-17β-ol-3-one or 17α-vinyl-19-nor-androstan-17β-ol-3-one) with a lower alkyl iodide in the presence of a potassium tertiary alkoxide resulted in the production of the corresponding novel 2,2-di lower alkyl-19-nor-androstan-17β-ol-3-one, 2,2,17α-tri-lower alkyl-19-nor-androstan-17β-ol-3-one and 2,2-di lower alkyl-17α-vinyl-19-nor-androstan-17β-ol-3-one. Further in accordance with the present invention it has been discovered that monobromination of the aforementioned compounds gave the corresponding 4-bromo-2,2-di lower alkyl or 2,2,17α-tri lower alkyl-19-nor-androstan-17β-ol-3-one compounds which on dehydrobromination gave the corresponding novel 2,2-di lower alkyl or 2,2,17α-tri lower alkyl-Δ⁴-19-nor-androsten-17β-ol-3-one compounds. Further 2,2-di lower alkyl-19-nor-androstan-17β-ol-3-one and 2,2-di lower alkyl-19-nor-Δ⁴-androsten-17β-ol-3-one were converted into the corresponding 17α-ethinyl compounds by oxidation to the corresponding 17-keto compounds followed by reaction with potassium butoxide and acetylene. Partial hydrogenation of the ethinyl compounds gave the same 17-vinyl derivatives previously mentioned and more complete hydrogenation gave the 17α-ethyl derivatives. All of the compounds previously mentioned upon treatment with a reducing agent gave the corresponding 3-hydroxy derivatives. By conventional esterification there was also prepared the esters of these compounds of the nontertiary alcohol groups.

The novel compounds of the present invention may therefore be illustrated by the following formulas:

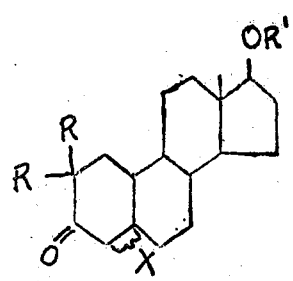

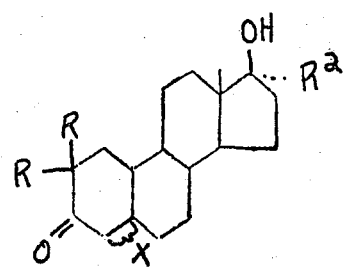

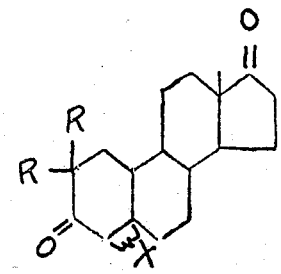

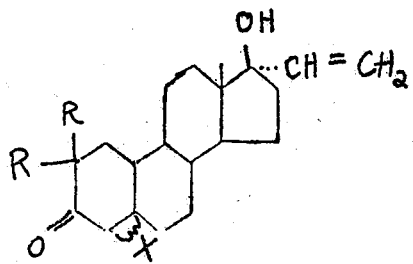

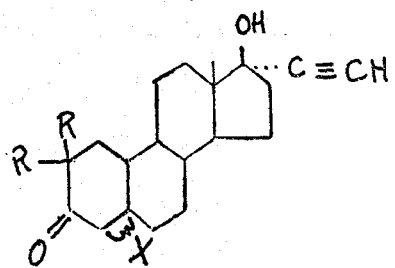

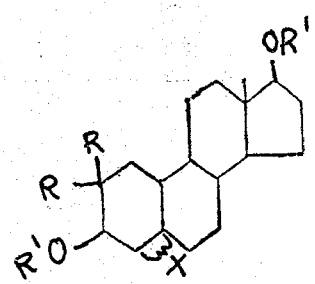

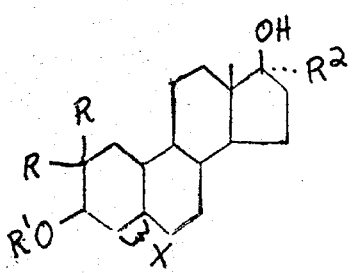

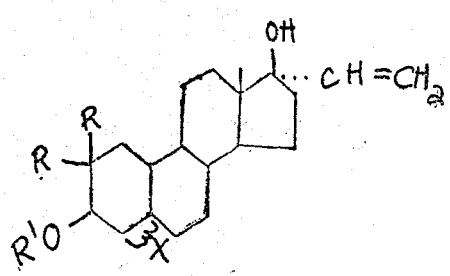

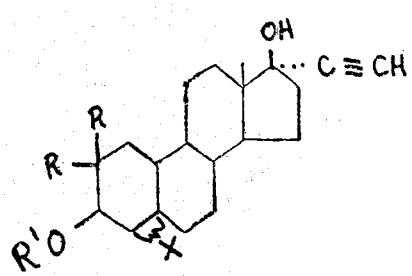

In the above formula R represents an alkyl group preferably a lower alkyl group of less than 7 carbon atoms such as methyl, ethyl and propyl. $R^1$ represents hydrogen or an acyl group of the type conventionally found in an esterified steroid alcohol. These are generally those derived from a hydrocarbon carboxylic acid of less than 12 carbon atoms such as acetic, propionic, butyric, valeric, hexanoic, cyclopentylpropionic, benzoic, etc. $R^2$ represents a lower alkyl group of less than 7 carbon atoms such as methyl, ethyl or propyl. X represents a double bond between C-4 and C-5 or a saturated linkage between C-4 and C-5.

The novel compounds of the present invention may be prepared by a process illustrated in part by the following equations:

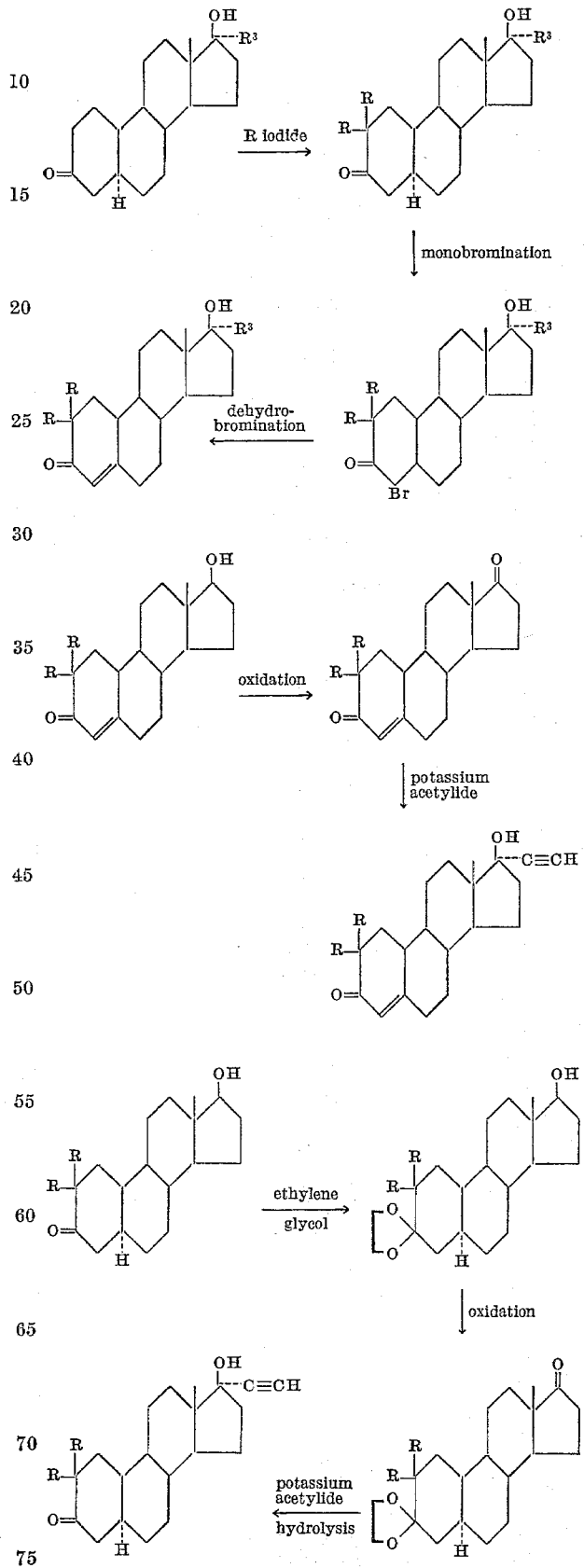

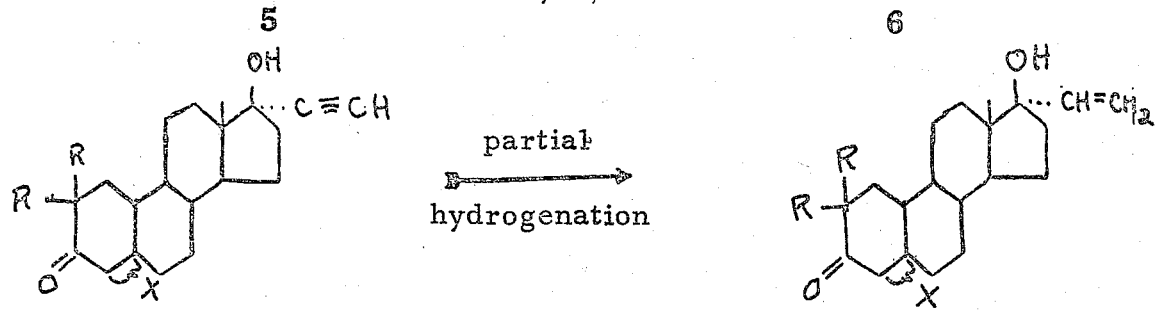

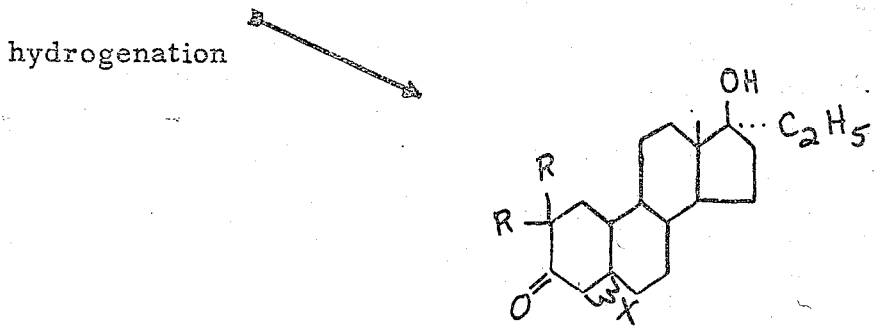

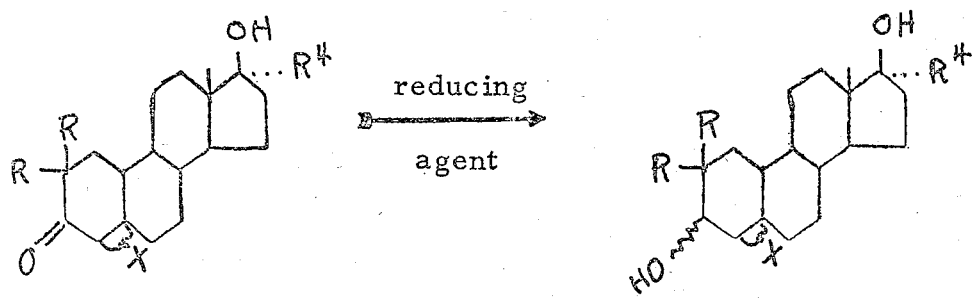

In the above equations R and X represent the same groups as heretofore set forth. $R^3$ represents hydrogen, a lower alkyl group of less than 7 carbon atoms ($R^2$) or vinyl. $R^4$ represents hydrogen, a lower alkyl group of less than 7 carbon atoms, vinyl or ethinyl.

Referring to the first equation above the starting compound which may be, as illustrated, 19-nor-androstan-17β-ol-3-one, or its 17α-lower alkyl or 17α-vinyl derivatives, in an organic solvent, preferably a tertiary lower aliphatic alcohol such as t-butanol, is mixed with a potassium t-alkoxide, such as potassium t-butoxide and the mixture stirred under nitrogen atmosphere for a short time such as ½ hour. An excess of a lower alkyl iodide such as methyl, ethyl or propyl iodide is then added and the reaction mixture stirred for a longer period of time i.e. of the order of 3 hours. Water is then added, the solution is neutralized with acid and the organic solvent is removed by reducing pressure distillation. The residue is then collected by filtration and purified to give the respective 2,2-di lower alkyl, or 2,2,17α-tri lower alkyl or 2,2-di lower alkyl-17α vinyl derivative of 19-nor-androstan-17β-ol-3-one. By conventional esterification procedures such as reaction with acid anhydrides or chlorides of the type previously described there is prepared the corresponding 17-acylates of hydrocarbon carboxylic acids of less than 12 carbon atoms of the 2,2-di lower alkyl compounds.

To prepare the corresponding $\Delta^4$-compounds the compounds resulting from the first step just referred to are treated with slightly over 1 molar equivalent of bromine preferably in carbon tetrachloride solution to prepare the corresponding 4-bromo compound and these compounds were dehydrobrominated with collidine. There were thus prepared 2,2-di lower alkyl-19-nor-$\Delta^4$-androsten-17β-ol-3-one compounds and their 17-esters or 2,2,17α-tri lower alkyl-19-nor-$\Delta^4$-androsten-17β-ol-3-one compounds a 2,2-di lower alkyl-17α-vinyl-19-nor-$\Delta^4$-androsten-17β-ol-3-one.

As indicated in the second equation oxidation of 2,2-di lower alkyl-19-nor-$\Delta^4$-androsten-17β-ol-3-one compounds with preferably chromium trioxide in aqueous acetone gave the corresponding 2,2-di lower alkyl-19-nor-$\Delta^4$-androsten-3,17-dione compounds. Reaction of these last with potassium acetylide gave the corresponding 17α-ethinyl, 17β-ol derivatives.

The same type of reaction applied to 2,2-di lower alkyl-19-nor-androstan-17β-ol-3-one compounds with intermediate protection of the 3-keto group by formation of an ethylene ketal and subsequent hydrolysis of the protective group gave the corresponding 2,2-di lower alkyl - 17α - ethinyl - 19 - nor - androstan - 17β - ol - 3 - one compound. This reaction is illustrated in the third of the above equations.

In the fourth equation above there is illustrated the reaction of the 17α-ethinyl derivatives with hydrogen to give the 17α-vinyl derivatives and upon more complete hydrogenation the 17α-ethyl derivatives. Preferably the partial hydrogenation was in pyridine in the presence of a palladium on calcium carbonate catalyst and the more complete hydrogenation of the ethinyl group was in dioxane solution with a palladium on charcoal catalyst.

Finally, in the fifth equation above there is illustrated the conversion of all of the aforementioned compounds to their 3-hydroxy derivatives. In this reaction the 3-keto 2,2-dimethyl derivative is treated in an organic solvent such as aqueous dioxane with a reducing agent such as lithium borohydride. For the preparation of the 3-esters of these compounds they were conventionally reacted with acid anhydrides or chlorides of hydrocarbon carboxylic acids of less than 12 carbon atoms preferably in pyridine.

The following specific examples serve to illustrate but are not intended to limit the present invention.

Example I

A solution of 4 g. of 17α-methyl-19-nor-dihydrotestosterone (17α-methyl-19-nor-androstan-17β-ol-3-one) in 50 cc. of anhydrous t-butanol was added to a cooled solution of potassium t-butoxide prepared by dissolving 2.2 g. of potassium in 75 cc. of anhydrous t-butanol. The mixture was cooled to 0° C. and treated with 7 cc. of methyl iodide; it was then stirred for 3 hours under an atmosphere of nitrogen, diluted with water and the precipitate was collected by filtration and purified by chromatography on a column of 200 g. of neutral alumina, thus giving 3.4 g. of 2,2,17α-trimethyl-19-nor-dihydrotestosterone of M.P. 128–130° C. Recrystallization from acetone-hexane yielded the pure compound, M.P. 140–142° C., $[\alpha]_D$ +102° (chloroform).

Example II

By the method of the previous example, 19-nor-dihydrotestosterone was converted into 2,2-dimethyl-19-nor-dihydrotestosterone.

5 g. of this 2,2-dimethyl-19-nor-dihydrotestosterone was mixed with 350 cc. of benzene, 35 cc. of ethylene glycol and 250 mg. of p-toluenesulfonic acid and the mixture was boiled under reflux for 48 hours with the use of an adapter for the continuous removal of the water formed during the reaction. 100 cc. of 2 normal sodium carbonate solution and 100 cc. of water were added to the cooled mixture and the benzene layer was separated, washed with water and evaporated to dryness. Recrystallization from acetone-hexane afforded 2,2-dimethyl-3-ethylenedioxy-19-nor-androstan-17β-ol.

A suspension of 3 g. of chromium trioxide in 25 cc. of pyridine was added to a solution of 3 g. of the above ketal in 20 cc. of anhydrous pyridine. The suspension was prepared by adding the powdered chromium trioxide in 4 portions to the pyridine, maintaining the temperature below 35° C., until the dark red color characteristic of chromium trioxide disappeared. The mixture of the steroid solution and the oxidizing reagent was kept for 24 hours at room temperature, diluted with ethyl acetate and filtered through celite; the solution was washed with water until the washings were colorless, dried over anhydrous sodium sulfate and evaporated to dryness under reduced pressure. There was thus obtained 2,2-dimethyl-3-ethylene-dioxy-19-nor-androstan-17-one.

2 g. of 2,2-dimethyl-3-ethylenedioxy-19-nor-androstan-17-one was dissolved in 80 cc. of anhydrous benzene and added under nitrogen to a cooled solution of potassium t-butoxide prepared by dissolving 2 g. of potassium metal in 100 cc. of anhydrous t-butanol, under an atmosphere of nitrogen. The stream of nitrogen was substituted by a slow stream of dried purified acetylene and this stream was allowed to pass through the solution for 40 hours. The mixture was then poured into 400 cc. of dilute hydrochloric acid, the organic solvents were removed by steam distillation, the residue was cooled and the precipitate was filtered; there was thus obtained 2,2-dimethyl - 17α-ethinyl-3-ethylenedioxy-19-nor-androstan-17β-ol.

Without further purification, the above precipitate was dissolved in 160 cc. of acetone, mixed with 400 mg. of p-toluenesulfonic acid and allowed to stand overnight at room temperature. It was then poured into water and the precipitate was collected, dried under vacuum and recrystallized from acetone-hexane, thus producing 2,2-dimethyl-17α-ethinyl-19-nor-androstan-17β-ol-3-one.

Example III

When in the method of Example I the 17α-methyl-19-nor-dihydrotestosterone was substituted by its 17α, -ethyl, -propyl or -vinyl analogue, there were obtained the 2,2-dimethyl derivatives of these 17α-alkyl or vinyl substituted 19-nor-dihydrotestosterones.

Example IV

When in the methods of the previous examples the methyliodide was substituted by ethyl iodide, there were obtained the corresponding 2,2-diethyl derivatives instead of the 2,2-dimethyl derivatives.

Example V

To a solution of 750 mg. of 2,2,17α-trimethyl-19-nor-dihydrotestosterone, prepared as described in Example I, in 25 cc. of dioxane there was added a solution of 500 mg. of sodium borohydride in 5 cc. of aqueous dioxane (9:1) and the mixture was kept for 3 hours at room temperature. It was then acidified with a few drops of acetic acid and diluted with water. The precipitate was filtered and washed with water, to give 680 mg. of 2,2,17α-trimethyl-19-nor-androstan-3β,17β-diol, M.P. 171–173° C., $[\alpha]_D$ +28° (chloroform).

Similarly, there was prepared 2,2-di lower alkyl (methyl or ethyl) 19-nor-androstan-3β,17β-diol from 2,2-di lower alkyl-(methyl or ethyl)-19-nor-dihydrotestosterone, as well as well as the corresponding 2,2-di lower alkyl-17α-methyl, ethyl, propyl, vinyl or ethinyl-19-nor-androstan-3β,17β-diols from the corresponding 17α-methyl, ethyl, propyl, vinyl or ethinyl-substituted 2,2-di-alkyl-19-nor-dihydrotestosterone.

Example VI

A solution of 1 g. of 2,2-dimethyl-19-nor-dihydrotestosterone in 20 cc. of carbon tetrachloride was mixed with a few drops of a saturated solution of hydrogen bromide in carbon tetrachloride, followed by the addition of 0.6 g. of bromine in 5 cc. of carbon tetrachloride, with stirring, and in the course of approximately 5 minutes, while the temperature of the mixture was maintained below 18° C.; it was then kept for 1 hour at room temperature, diluted with water, mixed with 100 cc. of ether and the organic layer was separated, washed with water, dried over anhydrous sodium sulfate and evaporated to dryness under reduced pressure. The residue consisted of the crude 4 - bromo - 2,2 - dimethyl-19-nor-dihydrotestosterone.

The above bromo compound was mixed with 5 cc. of collidine and the mixture was boiled under reflux for 1 hour. It was poured into dilute sulfuric acid and ice and the precipitate was extracted with ether. The ether solution was washed with dilute sulfuric acid and water, dried over anhydrous sodium sulfate and evaporated to dryness. The residue was purified by chromatography in a column of alumina, thus affording the pure 2,2-dimethyl-19-nor-testosterone.

Similarly, there were prepared the corresponding 2,2-dimethyl-17α-methyl or ethyl-19-nor-testosterones from the corresponding 17α-ethyl or methyl substituted 2,2-dimethyl-19-nor-dihydrotestosterones. The 2,2-diethyl-19-nor-dihydrotestosterones, with or without a methyl or ethyl substitutent at C–17α in a similar manner gave 2,2-diethyl-19-nor-testosterone or 2,2-diethyl-17α-methyl or ethyl-19-nor-testosterones, respectively.

Example VII

In other experiments the bromination of Example VI was carried out in glacial acetic acid instead of carbon tetrachloride, with the same final result.

Example VIII

An oxidizing solution was prepared by mixing 26 g. of chromium trioxide with 23 cc. of concentrated sulfuric acid and diluting with water to a total volume of 100 cc.

1 g. of 2,2-dimethyl-19-nor-testosterone, obtained by any of the methods of Examples VI and VII, was dissolved in 120 cc. of acetone and cooled to 10–15° C. in an ice bath. There was then added 1.6 cc. of the oxidizing solution, with stirring, in the course of 5 minutes, while the temperature was kept below 15° C. After 2 more minutes the mixture was diluted with water to a volume of approximately 500 cc. and the white precipitate formed was filtered, well washed with water, dried under vacuum and recrystallized from acetone-hexane. There was thus obtained 2,2-dimethyl-$\Delta^4$-19-nor-androsten-3,17-dione.

A solution of potassium t-butoxide was prepared by dissolving 1 g. of potassium metal in 14 cc. of t-butanol, the solution was cooled and the air in the apparatus was substituted by nitrogen. To this solution there was added a solution of 1 g. of 2,2-dimethyl-19-nor-$\Delta^4$-androsten-3,17-dione in 10 cc. of toluene, with stirring under nitrogen and in the course of 2 minutes. The stirring under nitrogen was continued for a further half hour, when a homogeneous brown solution was obtained. The nitrogen was then substituted for a slow stream of dried purified acetylene which was allowed to pass for 16 hours, at room temperature with stirring. The mixture was acidified with dilute hydrochloric acid to Congo red paper and the reaction product was extracted with toluene. The toluene was washed with water to neutral, dried over anhydrous sodium sulfate, filtered and concentrated under vacuum to approximately 15 cc. It was then passed through a short column of alumina, washing the column with a little toluene. Evaporation of the solution under reduced pressure afforded 2,2-dimethyl-17α-ethinyl-19-nor-testosterone, which was purified by recrystallization from acetone-hexane.

Example IX

A suspension of 300 mg. of 2% palladium on calcium carbonate in 30 cc. of pure pyridine was pre-hydrogenated at room temperature for 3 hours. There was then added 1 g. of 2,2-dimethyl-17α-ethinyl-19-nor-testosterone, prepared as described in Example VIII, and the mixture was stirred under hydrogen at room temperature until the equivalent of 1 mol of hydrogen had been absorbed. The catalyst was removed by filtration and washed with a little pyridine and the combined filtrate and washings was evaporated to dryness under vacuum. The residue was dissolved in ether, washed with dilute hydrochloric acid, water, 5% sodium carbonate solution and again with water to neutral. Recrystallization of the residue from acetone - hexane yielded 2,2-dimethyl-17α-vinyl-19-nor-testosterone.

Example X

A solution of 1 g. of 2,2-dimethyl-17α-vinyl-19-nor-testosterone, obtained as described in Example IX, in 75 cc. of dioxane was mixed with 0.4 g. of previously reduced 5% palladium on charcoal catalyst and the mixture was hydrogenated at room temperature with stirring until the equivalent of one mol of hydrogen was absorbed. It was then filtered through celite, washing the filter with dioxane, and the combined filtrate and washings was evaporated to dryness under reduced pressure. The residue crystallized from acetone-hexane to give 2,2-dimethyl-17α-ethyl-19-nor-testosterone.

Example XI

By the method of Example X, 2,2-dimethyl-17α-ethinyl-19-nor-testosterone was hydrogenated until the equivalent of 2 mols of hydrogen was absorbed. There was thus obtained 2,2-dimethyl-17α-ethyl-19-nor-testosterone, identical to the one obtained in accordance with the previous example.

Example XII

When in the method of Example VIII 2,2-dimethyl-19-nor-testosterone was substituted by 2,2-diethyl-19-nor-testosterone, there was obtained as an intermediate 2,2-diethyl-19-nor-$\Delta^4$-androsten-3,17-dione and as final product 2,2-diethyl-17α-ethinyl-19-nor-testosterone, which was in turn hydrogenated to 2,2-diethyl-19-nor-17α-vinyl-testosterone, in accordance with the method of Example IX.

Example XIII

A mixture of 1 g. of 2,2-dimethyl-19-nor-testosterone, 10 cc. of pyridine and 1 cc. of acetic anhydride was kept overnight at room temperature, poured into water and heated on the steam bath for half an hour. The mixture was cooled and the precipitate was collected, washed, dried and recrystallized from acetone-hexane. There was thus obtained 2,2-dimethyl-19-nor-testosterone acetate.

Example XIV

By the same conventional method of Example XIII, there was esterified the secondary hydroxyl groups of all of the 2,2-dimethyl-androstanes described; instead of an acid anhydride there can also be used the acid chloride. The anhydride or chloride were those derived from a hydrocarbon carboxylic acid of to 12 carbon atoms. There was thus prepared a great variety of esters, and more specifically, C–17 acetates, propionates, cyclopentylpropionates and benzoates of 2,2-methyl or ethyl-19-nor-testosterone and 2,2-dialkyl-19-nor-dihydrotestosterone, the same C–3 esters of the 17α-substituted 2,2-dialkyl-19-nor-androstan-3β,17β-diols previously described, as well as C–3,17 diesters of these diols without substituent at C–17α.

We claim:
1. 2,2,17α-trimethyl-19-nor-$\Delta^4$-androsten-17β-ol-3-one.
2. A compound of the following formula:

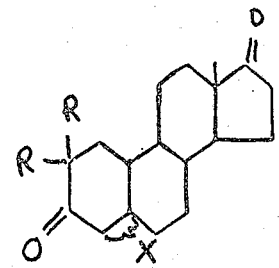

wherein R is a lower alkyl group and both R's are the same and X is selected from the group consisting of a double bond between C–4 and C–5 and a saturated linkage between C–4 and C–5.

3. 2,2-dimethyl-19-nor-$\Delta^4$-androsten-3,17-dione.
4. A compound of the following formula:

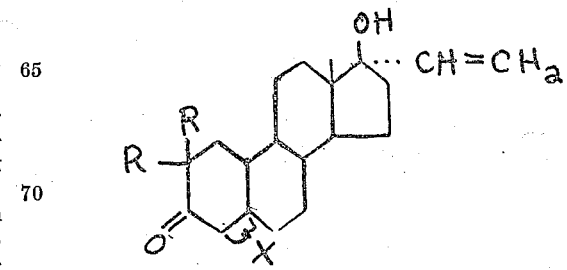

wherein R is a lower alkyl group and both R's are the same and X is selected from the group consisting of a double bond between C–4 and C–5 and a saturated linkage between C–4 and C–5.

5. 2,2-dimethyl - 17α - vinyl-19-nor-androstan-17β-ol-3-one.

6. 2,2,-dimethyl - 17α - vinyl-19-nor-Δ⁴-androsten-17β-ol-3-one.

7. A compound of the following formula:

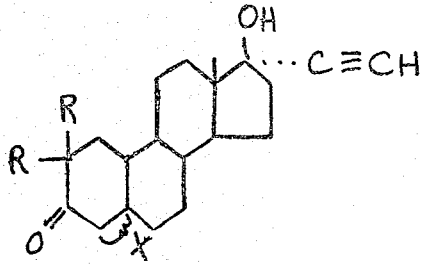

wherein R is a lower alkyl group and both R's are the same and X is selected from the group consisting of a double bond between C–4 and C–5 and a saturated linkage between C–4 and C–5.

8. 2,2-dimethyl - 17α - ethinyl-19-nor-androstan-17β-ol-3-one.

9. 2,2-dimethyl - 17α - ethinyl-19-nor-Δ⁴-androsten-17β-ol-3-one.

10. A compound of the following formula:

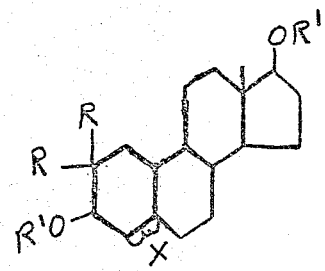

wherein R is a lower alkyl group and both R's are the same, X is selected from the group consisting of a double bond between C–4 and C–5 and a saturated linkage between C–4 and C–5 and R¹ is selected from the group consisting of hydrogen and a hydrocarbon carboxylic acyl group of less than 12 carbon atoms.

11. 2,2-dimethyl-19-nor-androstan-3β,17β-diol.

12. The hydrocarbon carboxylic esters of less than 12 carbon atoms of 2,2-dimethyl-19-nor-androstan-3β,17β-diol.

13. 2,2-dimethyl-19-nor-Δ⁴-androsten-3β,17β-diol.

14. The hydrocarbon carboxylic esters of less than 12 carbon atoms of 2,2-dimethyl-19-nor-Δ⁴-androsten-3β,17β-diol.

15. A compound of the following formula:

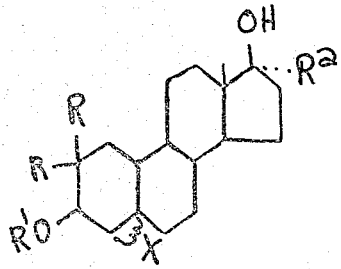

wherein R is a lower alkyl group and both R's are the same, R² is a lower alkyl group, X is selected from the group consisting of a double bond between C–4 and C–5 and a saturated linkage between C–4 and C–5 and R¹ is selected from the group consisting of hydrogen and a hydrocarbon carboxylic acyl group of less than 12 carbon atoms.

16. 2,2,17α-trimethyl - 19 - nor - androstan - 3β,17β-diol.

17. The 3-hydrocarbon carboxylic esters of less than 12 carbon atoms of 2,2,17α-trimethyl-19-nor-androstan-3β,17β-diol.

18. A compound of the following formula:

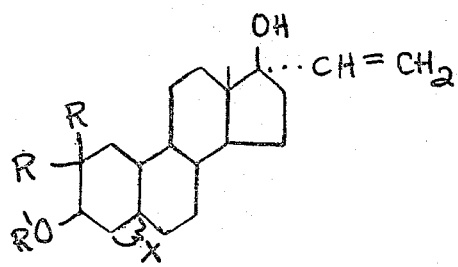

wherein R is a lower alkyl group and both R's are the same, X is selected from the group consisting of a double bond between C–4 and C–5 and a saturated linkage between C–4 and C–5 and R¹ is selected from the group consisting of hydrogen and a hydrocarbon carboxylic acyl group of less than 12 carbon atoms.

19. 2,2-dimethyl - 17α - vinyl-19-nor-androstan-3β,17β-diol.

20. A compound of the following formula:

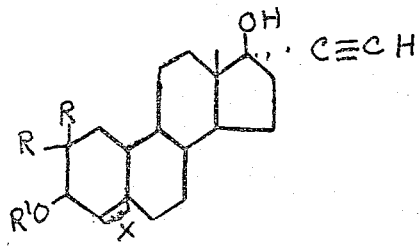

wherein R is a lower alkyl group and both R's are the same, X is selected from the group consisting of a double bond between C–4 and C–5 and a saturated linkage between C–4 and C–5 and R¹ is selected from the group consisting of hydrogen and a hydrocarbon carboxylic acyl group of less than 12 carbon atoms.

21. 2,2-dimethyl - 17α - ethinyl - 19 - nor-androstan-3β,17β-diol.

References Cited in the file of this patent

UNITED STATES PATENTS

| | | |
|---|---|---|
| 2,813,880 | Campbell et al. | Nov. 19, 1957 |
| 2,845,381 | Tindall | July 29, 1958 |
| 2,852,537 | Ringold et al. | Sept. 16, 1958 |

OTHER REFERENCES

Ringold et al.: Journal of Organic Chemistry (1956), vol. 21, pp. 1333–1334.